(12) United States Patent
Tran et al.

(10) Patent No.: US 12,444,286 B2
(45) Date of Patent: Oct. 14, 2025

(54) DETECTING THERMAL EVENT SPREAD PROBABILITY AND ALERTING VEHICLES / PEOPLE IN AFFECTED AREA

(71) Applicant: GM GLOBAL TECHNOLOGY OPERATIONS LLC, Detroit, MI (US)

(72) Inventors: Benjamin Tran, Royal Oak, MI (US); Eric T. Hosey, Royal Oak, MI (US); Russell A. Patenaude, Macomb Township, MI (US); Matthew E. Gilbert-Eyres, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 126 days.

(21) Appl. No.: 18/167,146

(22) Filed: Feb. 10, 2023

(65) Prior Publication Data

US 2024/0273988 A1 Aug. 15, 2024

(51) Int. Cl.
*G08B 17/00* (2006.01)
*H04W 4/02* (2018.01)
*H04W 4/021* (2018.01)
*H04W 4/90* (2018.01)

(52) U.S. Cl.
CPC .......... *G08B 17/005* (2013.01); *H04W 4/021* (2013.01); *H04W 4/025* (2013.01); *H04W 4/90* (2018.02)

(58) Field of Classification Search
CPC .... G08B 17/005; H04W 4/021; H04W 4/025; H04W 4/90
See application file for complete search history.

(56) References Cited

U.S. PATENT DOCUMENTS

| | | | |
|---|---|---|---|
| 2016/0090105 A1* | 3/2016 | Neubecker | A62C 3/07 701/1 |
| 2022/0021037 A1* | 1/2022 | Balazs | H01M 10/482 |
| 2022/0044023 A1* | 2/2022 | Xue | G06V 10/143 |
| 2023/0398872 A1* | 12/2023 | Gilbert-Eyres | G01R 31/396 |

* cited by examiner

*Primary Examiner* — Rufus C Point
(74) *Attorney, Agent, or Firm* — Quinn IP Law

(57) ABSTRACT

A process and system to detect and provide notification of a potential effect of a thermal event related to a vehicle and a process for updating thermal event probability of a specific area based on an effect of a vehicle are provided. Identifying potential vehicle thermal events and determining their potential effect in order to provide information related to the risk to both vehicle occupants and the proper authorities facilitates providing alerts and possible evacuation routes, and facilitates authorities providing the proper response. A vehicle is identified and information related to the identified vehicle, as well as information related to an area and an existing thermal event, are obtained and probability of a thermal event starting or potential spread of an existing thermal event is determined based on the obtained information and the potential is addressed before a thermal event starts or an existing thermal event spreads.

20 Claims, 2 Drawing Sheets

(a)

(b)

DETECTING THERMAL EVENT SPREAD PROBABILITY AND ALERTING VEHICLES / PEOPLE IN AFFECTED AREA

INTRODUCTION

The present disclosure is related to thermal events (TEs) and, more specifically, to identifying risks of a TE starting or an existing TE expanding due to a TE of a vehicle when the vehicle is identified as located within an area where TEs are a risk. Presence of the vehicle is identified, and information related to the identified vehicle as well as information related to the area and an existing TE is identified. A probability of a TE starting or potential spread of an existing TE can be determined based on the obtained information and the potential addressed before a TE starts or an existing TE spreads.

TEs related to electric and non-electric vehicles present a risk in areas that are susceptible to TEs, such as areas that have a lot of flammable materials. Such areas usually are at increased risk for sudden TEs as well as sudden spread once a TE starts.

Therefore, potential vehicle TEs should be identified, and their potential effect determined in order to provide information related to the risk to both vehicle occupants and the proper authorities such that the vehicle occupants are provided with alerts and possible evacuation routes, and authorities may provide the proper response. The present disclosure addresses this issue as well as other issues.

SUMMARY

The present disclosure provides a process, system to detect and provide notification of a potential effect of a thermal event (TE) related to a vehicle and a process for updating a TE probability of a specific area based on an effect of a vehicle. The process includes determining a first increased probability of a TE related to at least one vehicle within a specific area, obtaining vehicle data of at least one vehicle that is located within the specific area, obtaining area data related to flammability of the specific area, determining at least a second increased probability of occurrence of a TE or a third increased probability of spread of an existing TE within the specific area, and alerting a control point (CP) of the determined first increased probability, second increased probability and third increased probability. The determination of the first increased probability of the TE related to the at least one vehicle within a specific area may be based on at least the first increased probability, the obtained vehicle data, and the obtained area data.

The process may further include obtaining updated vehicle data from the at least one vehicle, obtaining updated area data related to the flammability of the specific area, determining an expanded specific area within which a potential TE may occur based on the updated vehicle data and updated area data, determining a probability of an increase in spread of the potential TE, and determining that at least one user is located within the expanded specific area, the at least one user utilizing a mobile application that provides a location of the at least one user, alerting the determined at least one user located within the expanded specific area of the determined probability of the increase, and alerting at least one CP of the determined expanded area and determined probability of the increase. The determined expanded specific area and the determined probability of the increase may be related to an active TE or potential TE caused by a thermal runaway propagation (TRP) event.

The obtained vehicle data may be at least a fuel level of an internal combustion engine (ICE), a number of cells of an electric vehicle (EV) or a size of cells of an EV. The event related to the vehicle may be a thermal runaway propagation (TRP) event of an EV or a TE of an ICE. The process my further include determining that at least one user is located within the specific area, the at least one user utilizing a mobile application that provides a location of the at least one user, and alerting the determined at least one user located in the specific area of the determined first increased probability, second increased probability and third increased probability.

The determined at least one user located within the specific area may or may not be an occupant of the at least one vehicle. The at least one CP may be a weather service or a Public Service Answering Point (PSAP).

The system includes a first probability detection function determining a first increased probability of a TE related to at least one vehicle within a specific area, a first data collection function obtaining vehicle data of at least one vehicle that is located within the specific area, a second data collection function obtaining area data related to flammability of the specific area, a second probability detection function determining at least a second increased probability of occurrence of a TE or a third increased probability of spread of an existing TE within the specific area, and a first alert function alerting at least one control point (CP) of the determined first increased probability, second increased probability and third increased probability. The determination of the first increased probability of the TE related to the at least one vehicle within a specific area may be based on at least the first increased probability, the obtained vehicle data, and the obtained area data.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, the present disclosure expressly includes combinations and sub-combinations of the elements and features presented previously and subsequently.

Figure 1:
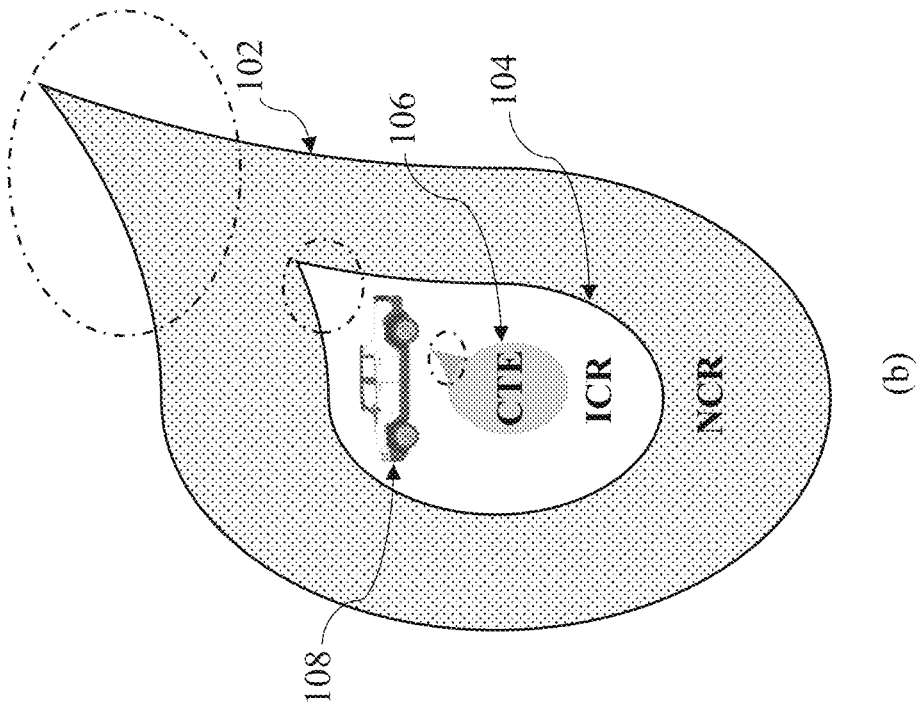
FIGS. 1(a) and 1(b) illustrate expansion of a thermal event risk probability area according to the present disclosure.
Figure 1:
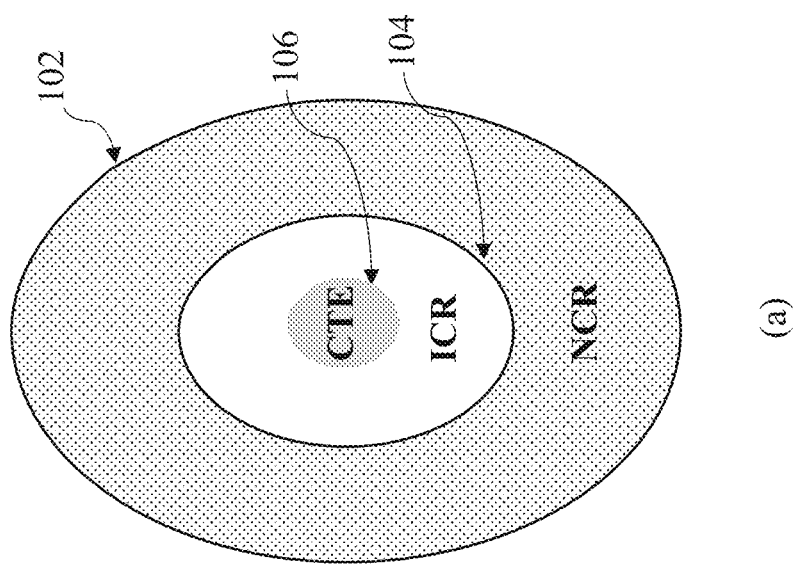

The present disclosure may be extended to modifications and alternative forms, with representative embodiments illustrated in the drawings and disclosed in detail herein. Inventive aspects of the present disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The following description is merely exemplary in nature and is not intended to limit the present disclosure, application, or uses. It should also be understood that throughout the drawings, corresponding reference numerals indicate like or corresponding parts and features.

The present disclosure is susceptible of embodiment in many different forms. Representative examples are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

A situation where an electrochemical cell heats up and is either destroyed or severely damaged, thereby causing damage to the immediate environment of the cell, is generally referred to as thermal runaway (TR). However, the term is often used without a clear definition. Defining the term "TR" helps to determine solutions to TR and safe handling in an electrochemical system, such as a lithium-ion battery.

TR exists in other battery technologies as well where the effects range from limited damage to catastrophic damage. The primary goal of a fail-safe battery management system is preventing TR and is addressed by the present disclosure.

Often, TR is defined as "a process of uncontrolled heat release and rapid temperature rise" or "higher heat generation than heat removal." However, there are drawbacks to such a definitions, at least with respect to electrochemical systems, such as batteries.

Most EV batteries heat up due to heat generation higher than heat removal. Therefore, an uncontrolled heat release with a rapid temperature increase may be normal and does not necessarily lead to dangerous temperature levels and subsequent damage to the cell.

Chemical and electrochemical systems may be susceptible to loss of control. In the case of unstoppable self-heating, a TR may occur.

In modern traction batteries, which include multiple sub-systems such as cells or modules, TR of one sub-system may affect other sub-systems. The effect on other sub-systems may lead to those sub-systems also going out of control, which is referred to as thermal runaway propagation (TRP).

In the event of an EV TRP or an Internal Combustion Engine (ICE) TE, the present disclosure will determine a vehicle TE's potential to start a TE by utilizing information, such as TE danger forecasts and vehicle data. In the event of an existing TE, the present disclosure will detect and notify vehicles with mobile application users that are in a projected path of the TE.

TRP is also of great significance due to the increased usage of lithium-ion batteries as traction batteries in EVs and the corresponding effect on passengers. These batteries often include dozens of cells. If one cell experiences TR, it might affect other cells, thereby causing TRP as a sequential occurrence of TR within a battery system triggered by thermal runaway of a cell in the system.

However, it helps to differentiate even further between thermal propagation (TP) as a propagation of a TE and TRP as the triggering of TR in adjacent cells or modules due to the occurrence of a first TR in a first cell. Since traction batteries contain many cells and modules to achieve heeded energy and power ranges, this is a problem that becomes more severe with the increase of electromobility.

The present disclosure addresses the effects of TR, specifically with respect to lithium-ion batteries in a more fundamental way. This will facilitate future standardization.

The temperature in an electrochemical cell results from heat generation and heat exchange with the environment. Heat transfer differs greatly between different points in a cell.

Anisotropic thermal conductivity is a phenomenon in which the temperature difference between neighboring areas depends on the exact point that is considered. Additionally, heat generation differs because of inhomogeneous current density and local differences in equilibrium voltage.

Materials that can release large amounts of energy are separated. Since two electrodes and a separator are often utilized, conditions related to occurrence of a TR are different for each of the two separate electrodes as well as the two electrodes in contact with each other.

The present disclosure determines a vehicle's potential to cause a TE as well as affect an existing TE's projected path. The present disclosure determines the potential based upon fuel level, engine temperature, state of a vehicle battery, wind speed and direction, as well as other factors.

The present disclosure further calculates a new projected path of a TE by utilizing collected data and notifies a Control Point (CP) in the area to facilitate emergency services and mitigation measures. The CP may be a weather service or a Public Service Answering Point (PSAP) PSAP. The weather service may be a National Weather Service (NWS). The PSAP may be a third-party response center, such as an OnStar™ back office. The present disclosure can also detect and notify more vehicles and mobile application users based on an updated projected TE path.

FIGS. 1(a) and 1(b) illustrate expansion of a thermal event risk probability area according to the present disclosure. As illustrated in FIGS. 1(a) and 1(b), a TE risk probability area 100 is originally defined by at least a No Current Risk (NCR) area 102 and an Immediate Current Risk (ICR) area 104. The TE risk probability area 100 may also be defined by a Current TE (CTE) area 106 if an existing TE has already been identified.

The NCR area 102 is an area in which there is no current risk of a TE occurring or an area in which there is no current risk of a previously identified TE spreading. The ICR area 104 is an area in which there is a presently identified current risk of a TE occurring or an area in which there is a presently identified current risk of a previously identified TE spreading. The CT area 106 is an area within which an existing TE has been identified.

As illustrated in FIG. 1(b), the TE risk probability area 100 may be adjusted, as indicated by the dotted areas, when a vehicle 108 is detected within the area. It is noted that the adjusted TE risk area, as indicated by the doted lines, is an example and may be of a different size or different shape than illustrated in FIG. 1(b). It is further noted each of the NCR area 102, ICR area 104 and CT area 106 may not be adjusted or may be adjusted with corresponding different shapes or sizes.

The adjustment in the TE risk probability area 100 may be based on information related to the vehicle 108 as well as atmospheric information related to the NCR area 102 and ICR area 104 as well as the CT area 106, if applicable. The vehicle 108 may be an EV or an ICE vehicle.

When the vehicle 108 is detected, the present disclosure obtains and evaluates information related to the vehicle as well as information related to the TE risk probability area 100. The obtained information is utilized to adjust the TE risk probability area 100, specifically to adjust the previously identified NCR area 102 or ICR area 104 as well as the CT area 106, if applicable, due to the potential for an event related to the identified vehicle 108 to either cause a TE or cause a previously-identified TE to spread. If an adjustment of the TE risk probability area 100 is identified, the identified NCR area 102 and ICR area 104 as well as the CT area 106, if applicable, are adjusted accordingly to indicate the identified adjustment.

The obtained information related to the vehicle 108 may be a fuel level of an ICE, a number of cells of an EV, a size of cells of an EV or other information that could increase/decrease a potential for a TE starting or expanding. The information related to the TE risk probability area 100 may be related to flammability of brush and atmospheric conditions or other information that facilitates a determination of a risk of a potential TE.

The potential for the identified vehicle 108 to either cause a TE or cause an existing TE to spread may be based on a potential vehicle 108 TE or a potential TR event of the vehicle. An algorithm would utilize the obtained information to determine how the identified vehicle 108 would contribute to a magnitude or change of shape/size of the TE risk probability area 100.

The algorithm may utilize a Severity Threshold (ST) to determine if a vehicle 108 event could cause a TE as well as cause a vehicle TE. Additionally, a TR event can have different levels of notification, such as low/medium/high, with the levels based on different potentials of a TE occurring or spreading.

For example, a low notification level may indicate a diagnostic potential that might require service. On the other hand, a high notification level may indicate an imminent potential that may be seconds or minutes from happening.

Although the adjusted TE risk probability area 100 indicated by the dotted areas in FIG. 1(*b*) is illustrated as increased, the adjusted TE risk probability area may be decreased or some of the areas may be increased while other areas may be decreased. Furthermore, each of the NCR area 102, ICR area 104 and CT area 106 may not be adjusted. Moreover, additional areas may be identified, such as a second TE risk probability area that includes a second NCR area, second ICR area and second CT area, if applicable. The adjusted areas or additional areas would be reported to local authority jurisdictions for presentation to mobile application users including those in the identified vehicle 108.

Figure 2:
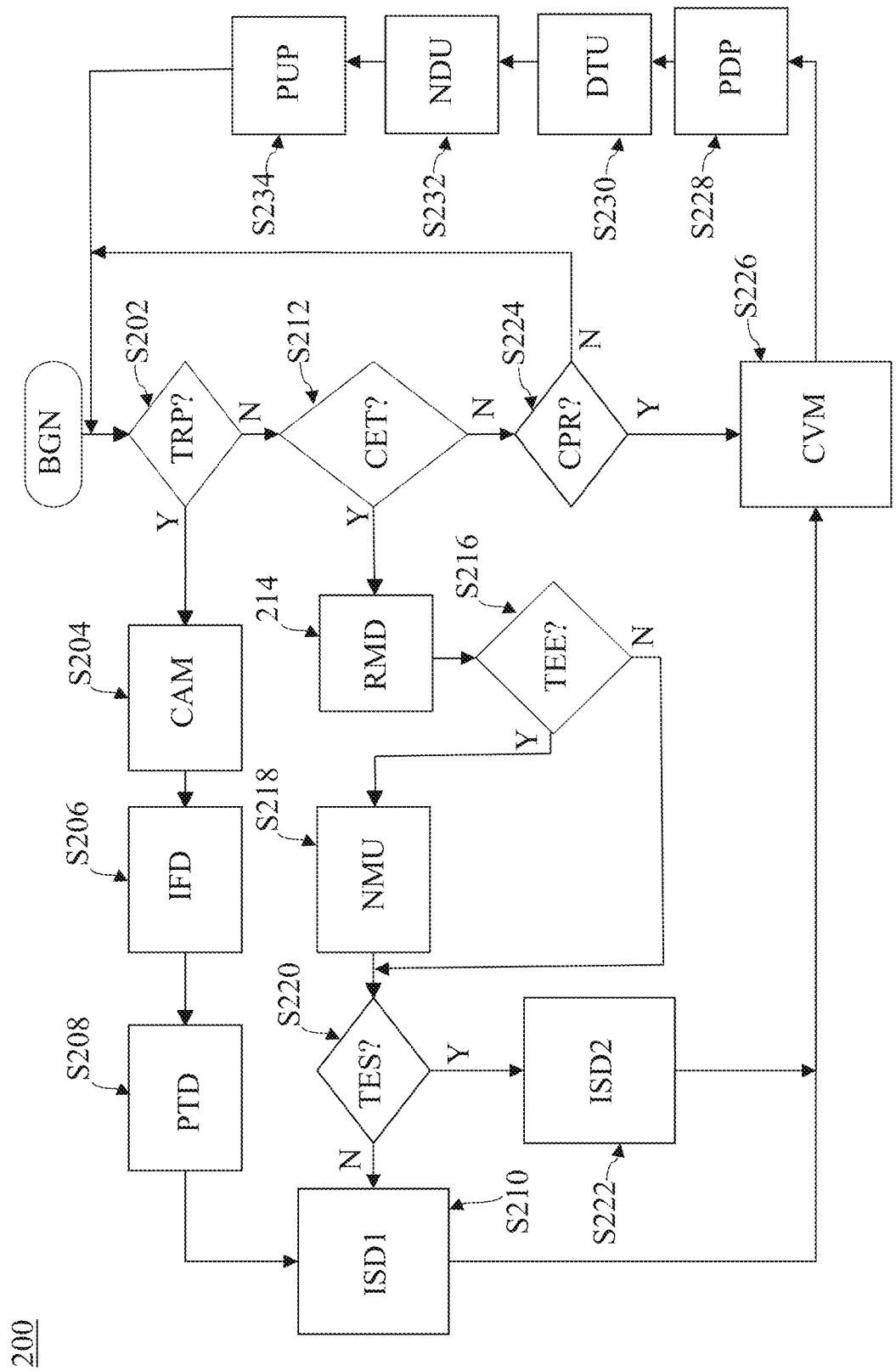
FIG. 2 illustrates a process for determining thermal event risk probability according to the present disclosure.

FIG. 2 illustrates a process for determining and adjusting thermal event risk probability according to the present disclosure. As illustrated in FIG. 2, the process 200 begins (BGN).

At step S202, it is determined if a new EV TRP event is detected (TRP?). If it is determined at step S202 that no TRP is detected, the process proceeds to step S212. If it is determined in step S202 that TRP is detected, processing is performed, in steps S204 to S210, to determine potential TE probability posed by the detected TRP.

At step S204, cameras are monitored (CAM) to identify potential issues in the specific area around the location of the detected TRP, such as brush and other flammable items nearby. The process then proceeds to step S206.

At step S206, an index related to flammability based on issues identified at step S204 is determined (IFD). For example, a Wildland TE Potential Index (WTPI) may be determined. The process then proceeds to step S208.

At step S208, a probability of a TE starting due to a potential vehicle TE caused by the TRP is determined (PTD). The potential for an existing TE increasing in size due to a potential vehicle TE also be determined. The process than proceeds to step S210.

At step S210, an index related to a potential for a new TE to increase to greater than a specific size, such as 500 acres, is determined (ISD1). For example, a WTPI-based Large TE Probability (WLTP) may be determined. (See previous comment) The process then proceeds to step S226.

If it is determined at step S202 that no TRP is detected, the process proceeds to step S212. At step S212, it is determined if conditions related to an existing TE exceed a specific threshold (CET?). For example, it may be determined if a mobile application user is detected within a specific proximity to the existing TE or if a severity of the existing TE exceeds a specific threshold.

If it is determined at step S212 that CET does not exist, the process proceeds to step S224. If it is determined at step S212 that CET exists, processing is performed, in steps S214 to S222, to determine a proper response.

At step S214, a range of motion of the vehicle is determined (RMD). The process then proceeds to step S216.

At step S216, it is determined if a specific threshold for evacuation is exceeded (TEE?). For example, it may be determined if the RMD meets a specific criteria or if a severity of the existing TE exceeds a specific threshold. If is determined at step S216 that TEE does not exist, the process proceeds to step S220. If it is determined at step S216 that TEE exists, the process proceeds to step S218.

At step S218, notification to a detected mobile application user is provided with a suggested evacuation route (NMU). The process then proceeds to step S220.

At step S220, it is determined if the existing TE exceeds a specific size (TES?). If it is determined at step S220 that TES does not exist, the process proceeds to previously disclosed step S210. If is determined at step S220 that TES does exist, the process proceeds to step S222.

At step S222, a potential for the existing TE to increase to greater than a specific size, such as 500 acres is, determined (ISD2). As previously noted, a WLTP may be determined. The process then proceeds to step S226.

At step S224, it is determined if a CP has requested data (CPR?). If it is determined at step S224 that CPR does not exist, processing returns to previously disclosed step S202 and the process repeats. If is determined at step S224, that CPR exists, processing is performed, in steps S226 to S234, to address the CPR.

At step S226, various conditions of the vehicle are monitored (CVM). For example, conditions such as engine temperature, fuel levels, charge status of an EV, battery conditions, wind speed and direction, as well as other conditions may be monitored. The process then proceeds to step S228.

At step S228, the requested data are provided to the CP (PDP). The data provided to the CP may include the conditions monitored in step S226 as well as other conditions previously monitored, and indexes previously determined, such as in steps S210 and S222. The process then proceeds to step S230.

At step S230, data related to an existing TE and new TE are uploaded (DTU). For example, the data uploaded may be related to TE range and projected path. The process then proceeds to step S232.

At step S232, at least one CP is notified of the data updated at step S230 (NDU). The process then proceeds to step S234.

At step S234, the detected mobile application user is provided with an updated probability related to a potential severity of conditions in an area in which the user is located (PUP). The process then proceeds to previously disclosed step S202 and repeats.

The process illustrated in FIG. 2 may be performed for multiple EVs located, respectively, in multiple areas. The process illustrated in FIG. 2 may be performed for multiple potential TEs and multiple existing TEs. The process illustrated in FIG. 2 may further be performed for multiple mobile application users determined within, respectively, a specific proximity to multiple existing TEs.

Although the process illustrated in FIG. 2 is related to a TRP of an EV, the process is also applicable to a non-EV. For example, steps of the process illustrated in FIG. 2 may be altered to obtain information related to a potential TE in an identified non-EV.

The present disclosure facilitates response to and alerts mobile application users within proximity of a TE as well as other entities of potential TEs of which they would not otherwise be aware. The present disclosure further provides updated projection of potential TEs based on obtained vehicle data and terrain data.

The detailed disclosure and the drawings are supportive and descriptive of the present disclosure, but the scope of the present disclosure is defined solely by the appended claims. While some of the best modes and other embodiments for carrying out the present disclosure have been disclosed in detail, various alternative designs and embodiments exist for practicing the present disclosure as recited in the appended claims. Moreover, the present disclosure expressly includes combinations and sub-combinations of the elements and features disclosed herein.

Aspects of the present disclosure have been presented in general terms and in detail with reference to the illustrated embodiments. Various modifications may be made by those skilled in the art without departing from the scope and spirit of the disclosed embodiments. One skilled in the relevant art will also recognize that the disclosed methods and supporting hardware implementations may be alternatively embodied in other specific forms without departing from the scope of the present disclosure. Therefore, the present disclosure is intended to be illustrative without limiting the inventive scope defined solely by the appended claims.

Persons skilled in the art will recognize that disclosed function(s) or algorithm(s) may be implemented by hardware, software or a combination of software and hardware. Disclosed functions may correspond to modules which may be software, hardware, firmware, or combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or utilizing one or more Digital Signal Processor (DSPs). Although some of the present disclosure is directed to software installed and executing on computer hardware, alternative implementations as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or other equivalent medium capable of storing computer-readable instructions.

For purposes of the present disclosure, unless specifically disclaimed, use of the singular includes the plural and vice versa, the terms "and" and "or" shall be both conjunctive and disjunctive, and the words "including", "containing", "comprising", "having", and similar terms shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, a component that is "configured to" perform a specified function is capable of performing the specified function without alteration, rather than merely having potential to perform the specified function after further modification. In other words, the disclosed hardware, when expressly configured to perform the specified function, is specifically selected, created, implemented, utilized, programmed, and/or designed for the purpose of performing the specified function.

The terminology used herein is for the purpose of disclosing particular example embodiments and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof.

Although the open-ended term "comprising," is to be understood as a non-restrictive term used to disclose and claim various embodiments set forth herein, in certain aspects, the term may alternatively be understood to instead be a more limiting and restrictive term, such as "consisting of" or "consisting essentially of." Thus, for a given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps.

In the case of "consisting of," the alternative embodiment excludes additional compositions, materials, components, elements, features, integers, operations, and/or process steps, while in the case of "consisting essentially of," additional compositions, materials, components, elements, features, integers, operations, and/or process steps that materially affect the basic and novel characteristics are excluded from such an embodiment, but compositions, materials, components, elements, features, integers, operations, and/or process steps that do not materially affect the basic and novel characteristics may be included in the embodiment.

Method steps, processes, and operations disclosed herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to disclose the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to disclose various steps, elements, components, regions, layers and/or sections, these steps, elements, components, regions, layers and/or sections should not be limited by these terms, unless otherwise indicated. These terms may be used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section disclosed herein could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein to disclose one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed disclosure, numerical values of parameters (e.g., of quantities or conditions) in this specification, including the appended claims, are to be understood as being modified by the term "about" or "approximately" regardless of whether "about" or "approximately" actually appears before the numerical value. In addition, disclosure of ranges includes disclosure of values and further divided ranges within the entire range, including endpoints and sub-ranges given for the ranges.

The word "about" or "approximately" indicates that the stated numerical value allows some slight imprecision (with some approach to exactness in the value;

approximately or reasonably close to the value; nearly). If the imprecision provided by "about" or "approximately" is not otherwise understood in the art with this ordinary meaning, then "about" or "approximately" as used herein indicates at least variations that may arise from ordinary methods of measuring and utilizing such parameters. For example, "about" or "approximately" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

What is claimed is:

1. A non-transitory computer-readable storage medium embodying programmed instructions which, when executed by a processor, are operable for performing a method to detect and provide notification of a potential effect of a thermal event (TE) related to a vehicle, the method comprising:
    determining a first increased probability of a TE related to at least one vehicle within a specific area;
    obtaining vehicle data of at least one vehicle that is located within the specific area;
    when the first increased probability of the TE related to the vehicle is detected by the processor from the obtained vehicle data, obtaining area data related to flammability of the specific area from at least one camera located in the specific area of the TE related to the at least one vehicle;
    determining at least a second increased probability of occurrence of the existing TE or a third increased probability of spread of the existing TE within the specific area, the determination based on at least the first increased probability, the obtained vehicle data, and the obtained area data;
    alerting at least one control point (CP) of the determined first increased probability, second increased probability and third increased probability;
    determining that at least one user is located within the specific area, the at least one user utilizing a mobile application that provides a location of the at least one user; and
    alerting the determined at least one user located in the specific area of the determined first increased probability, second increased probability and third increased probability and providing an evacuation route to the at least one user through the mobile application.

2. The non-transitory computer-readable storage medium of claim 1, the method further comprising:
    obtaining updated vehicle data from the at least one vehicle;
    obtaining updated area data related to the flammability of the specific area;
    determining an expanded specific area within which a potential TE may occur based on the updated vehicle data and updated area data;
    determining a probability of an increase in spread of the potential TE; and
    determining that at least one user is located within the expanded specific area, the at least one user utilizing a mobile application that provides a location of the at least one user;
    alerting the determined at least one user located within the expanded specific area of the determined probability of the increase; and
    alerting at least one CP of the determined expanded area and determined probability of the increase.

3. The non-transitory computer-readable storage medium of claim 2, wherein the determined expanded specific area and the determined probability of the increase are related to an active TE or potential TE caused by a thermal runaway propagation (TRP) event.

4. The non-transitory computer-readable storage medium of claim 1, wherein the obtained vehicle data is at least a fuel level of an internal combustion engine (ICE), a number of cells of an electric vehicle (EV) or a size of cells of an EV.

5. The non-transitory computer-readable storage medium of claim 1, wherein the event related to the vehicle is a thermal runaway propagation (TRP) event of an electrical vehicle (EV) or a TE of an internal combustion engine (ICE).

6. The non-transitory computer-readable storage medium of claim 1, wherein the determined at least one user located within the specific area is an occupant of the at least one vehicle.

7. The non-transitory computer-readable storage medium of claim 1, wherein the determined at least one user located within the specific area is not an occupant of the at least one vehicle.

8. The non-transitory computer-readable storage medium of claim 1, wherein the at least one CP is a weather service or a Public Service Answering Point (PSAP).

9. A system to detect and provide notification of a potential effect of a thermal event (TE) related to a vehicle, the system comprising:
- a processor;
- at least one camera located in a specific area including the vehicle;
- a non-transitory computer-readable storage medium embodying programmed instructions which, when executed by the processor, are operable for performing a method, comprising:
  - a first probability detection function determining a first increased probability of a TE related to at least one vehicle within a specific area;
  - a first data collection function obtaining vehicle data of at least one vehicle that is located within the specific area;
  - when the first increased probability of the TE related to the vehicle is detected by the processor from the first data collection function, the processor performing:
    - a second data collection function, via the camera, obtaining area data related to flammability of the specific area;
    - a second probability detection function determining at least a second increased probability of occurrence of a TE or a third increased probability of spread of an existing TE within the specific area, the determination based on at least the first increased probability, the obtained vehicle data, and the obtained area data;
    - a first alert function alerting at least one control point (CP) of the determined first increased probability, second increased probability and third increased probability;
    - a mobile application detection function determining that at least one user is located within the specific area, the at least one user utilizing a mobile application that provides a location of the at least one user;
    - a second alert function alerting the determined at least one user located within the specific area of the determined first increased probability, second increased probability and third increased probability and providing an evacuation route to the at least one user through the mobile application.

10. The system of claim 9, wherein:
- the first data collection function further obtains updated vehicle data from the at least one vehicle;
- the second data collection function further obtains updated area data related to the flammability of the specific area;
- the first probability detection function further determines an expanded specific area within which a potential TE may occur based on the updated vehicle data and determines a probability of an increase in spread of the potential TE;
- the first alert function further alerts the at least one CP of the determined expanded area and determined probability of the increase; and further comprising:
- a mobile application detection function determining that the at least one user is located within the expanded specific area, the at least one user utilizing a mobile application that provides a location of the at least one user; and
- a second alert function alerting the determined at least one user located within the expanded specific area of the determined first increased probability, second increased probability and third increased probability.

11. The system of claim 10, wherein the determined expanded specific area and the determined probability of the increase in spread is related to an active TE or potential TE caused by a thermal runaway propagation (TRP) event.

12. The system of claim 9, wherein the obtained vehicle data is at least a fuel level of an internal combustion engine (ICE), a number of cells of an electric vehicle (EV) or a size of cells of an EV.

13. The system of claim 9, wherein the event related to the vehicle is a thermal runaway propagation (TRP) event of an electrical vehicle (EV) or a TE of an internal combustion engine (ICE).

14. The system of claim 9, wherein the determined at least one user located within the specific area is an occupant of the at least one vehicle.

15. The system of claim 9, wherein the determined at least one user located within the specific area is not an occupant of the at least one vehicle.

16. The system of claim 9, wherein the at least one CP is a weather service or a Public Service Answering Point (PSAP).

17. A non-transitory computer-readable storage medium embodying programmed instructions which, when executed by a processor, are operable for performing a method for updating a thermal event (TE) probability of a specific area based on an effect of a vehicle, the method comprising:
- determining a TE probability area defined by at least a first area and a second area, the first area includes an area within which there is no current risk of a TE occurring or an area within which there is no current risk of a previously identified TE spreading and the second area includes an area within which there is a presently identified current risk of a TE occurring or an area within which there is a presently identified current risk of a previously identified TE spreading;
- determining at least one vehicle that is located within the specific area;
- obtaining vehicle data of the at least one vehicle;
- when the first increased probability of the TE related to the vehicle is detected by the processor from the vehicle data, obtaining area data related to flammability of the first TE probability area from at least one camera located in the specific area;
- adjusting the determined TE probability area by adjusting at least one of the first area and the second area based on at least the obtained vehicle data and area data;
- determining that at least one user is located within the specific area, the at least one user utilizing a mobile application that provides a location of the at least one user; and
- alerting the determined at least one user located in the specific area of the determined first increased probability, second increased probability and third increased probability through the mobile application and providing an evacuation route to the at least one user through the mobile application.

18. The non-transitory computer-readable storage medium of claim 17, wherein:
- the specific area is further defined by a third area within which an existing TE has already been identified;

obtaining the area data comprises obtaining data related to the third area; and adjusting the determined TE probability area comprises adjusting the third area based on at least the obtained vehicle data and area data.

19. The non-transitory computer-readable storage medium of claim 17, the method further comprising:

obtaining updated vehicle data from the at least one vehicle;

obtaining updated area data related to the flammability of the specific area;

determining an expanded specific area within which a potential TE may occur based on the updated vehicle data and updated area data;

determining a probability of an increase in spread of the potential TE; and determining that at least one user is located within the expanded specific area, the at least one user utilizing a mobile application that provides a location of the at least one user;

alerting the determined at least one user located within the expanded specific area of the determined probability of the increase; and alerting at least one CP of the determined expanded area and determined probability of the increase.

20. The non-transitory computer-readable storage medium of claim 19, wherein the at least one CP is a weather service or a Public Service Answering Point (PSAP).

* * * * *